(12) United States Patent
Gjoerup

(10) Patent No.: US 9,201,824 B2
(45) Date of Patent: Dec. 1, 2015

(54) METHOD AND APPARATUS FOR ADAPTIVE DATA CHUNK TRANSFER

(75) Inventor: Karsten Gjoerup, Aalborg (DK)

(73) Assignee: Intel Deutschland GmbH, Neubiberg (DE)

( * ) Notice: Subject to any disclaimer, the term of this patent is extended or adjusted under 35 U.S.C. 154(b) by 623 days.

(21) Appl. No.: 12/357,455

(22) Filed: Jan. 22, 2009

(65) Prior Publication Data

US 2010/0185803 A1 Jul. 22, 2010

(51) Int. Cl.
G06F 13/00 (2006.01)
G06F 13/28 (2006.01)
G06F 13/38 (2006.01)

(52) U.S. Cl.
CPC .................. *G06F 13/385* (2013.01)

(58) Field of Classification Search
CPC ..................................... G06F 13/385
See application file for complete search history.

(56) References Cited

U.S. PATENT DOCUMENTS

| 7,039,788 | B1 | 5/2006 | Chang et al. |
| 7,254,668 | B1 | 8/2007 | Chang et al. |
| 7,594,057 | B1* | 9/2009 | Gandhi et al. ............... 710/308 |
| 2002/0147882 | A1 | 10/2002 | Pua et al. |
| 2006/0171414 | A1 | 8/2006 | Katibian et al. |
| 2006/0184720 | A1 | 8/2006 | Sinclair et al. |
| 2007/0088867 | A1 | 4/2007 | Cho et al. |
| 2007/0121493 | A1 | 5/2007 | Bhardwaj et al. |
| 2008/0071943 | A1* | 3/2008 | Song et al. ...................... 710/22 |
| 2010/0049915 | A1* | 2/2010 | Burkey et al. ................. 711/114 |
| 2010/0082892 | A1* | 4/2010 | Ma et al. ........................ 711/103 |

FOREIGN PATENT DOCUMENTS

DE 102006046417 A1 5/2007

* cited by examiner

*Primary Examiner* — Edward Dudek, Jr.

(57) ABSTRACT

A block memory device and method of transferring data to a block memory device are described. Various embodiments provide methods for transferring data to a block memory device by adaptive chunking. The data transfer method comprises receiving data in a data chunk. The data transfer method then determines that the data chunk is ready to be transferred to a block memory and transfers the data chunk to the block memory. The transfer occurs over duration, repeating the above steps until the transfer is complete. The data transfer method determines that the data chunk is ready to be transferred to the block memory based on at least in part on a duration of a previous transfer.

13 Claims, 5 Drawing Sheets

METHOD AND APPARATUS FOR ADAPTIVE DATA CHUNK TRANSFER

BACKGROUND OF THE INVENTION

Data transfer protocols transfer data between and among a wide variety of devices. Devices have a range of memory formats, each with particular storage characteristics. One memory format, block memory, erases one or more blocks of memory before storing data. The amounts of time taken by a block memory device to erase a block of memory and/or store data frequently fluctuate. In addition, different types of block memory, such as NAND and NOR flash, differ in the durations it takes to erase and/or store.

Most data transfer protocols define a fixed-sized data frame to be used across all memory types. For some types of block memory, however, a fixed-sized data frame may be inefficient because the size of the data frame and the number of such frames sent during a data transfer may be ill-matched to the storage characteristics of a block memory device. Currently, it is common practice to chunk the data frame into predetermined, fixed chunk sizes and buffer the data chunks to transfer the data frame in parallel within the target device.

SUMMARY OF THE INVENTION

Various embodiments provide methods for transferring data to a block memory device by adaptive chunking. The data transfer method comprises receiving data in a data chunk. The data transfer method then determines that the data chunk is ready to be transferred to a block memory and transfers the data chunk to the block memory. The transfer occurs over a duration, repeating the above steps until the transfer is complete. The data transfer method determines that the data chunk is ready to be transferred to the block memory based on at least in part on a duration of a previous transfer.

Another embodiment provides a block memory device having a block memory, a buffer, an interface, and a controller. The interface is configured to connect to an electronic device. The controller is configured to determine that a data chunk is ready to be transferred to the block memory, wherein determining that the data chunk is ready to be transferred to the block memory is based at least in part on a duration of a previous transfer.

BRIEF DESCRIPTION OF THE DRAWINGS

In the drawings, like reference characters generally refer to the same parts throughout the different views. The drawings are not necessarily to scale, including timelines, with emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

Figure 1A:
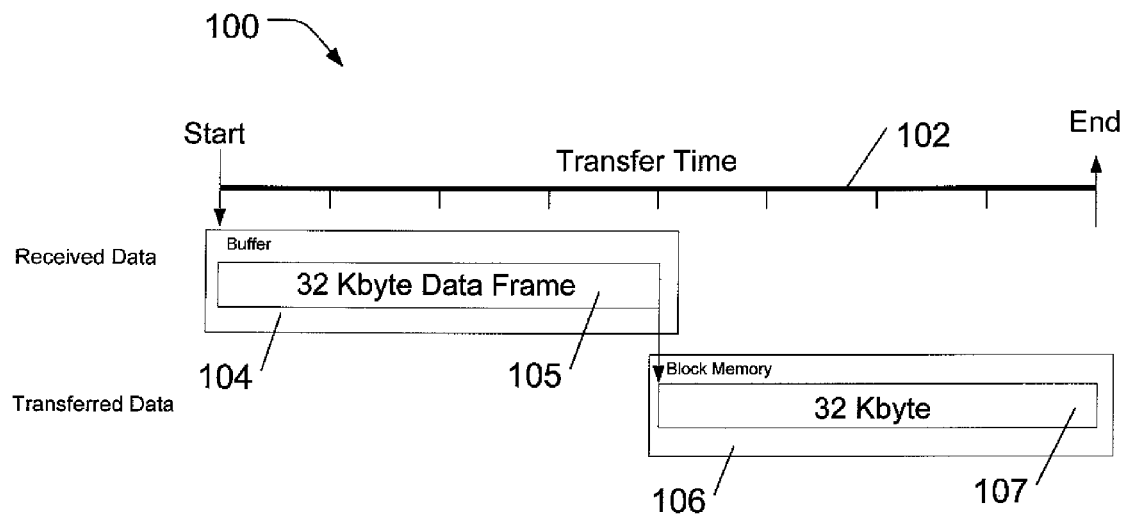
FIG. 1A shows a conventional serial data transfer scheme.

FIGS. 1-3 show conventional serial and parallel data transfer schemes in various environments. In FIG. 1, the total transfer time of conventional serial data transfer scheme 100 is measured by timeline 102. Buffer 104 receives a 32-Kbyte data frame 105 from a transmitting device (not shown). The length of data frame 105 along with timeline 102 represents the transmission duration; that is, the time taken for the transmitting device to transmit the 32-Kbyte data frame. Once buffer 104 receives the entire 32-Kbyte data frame 105, the data frame 105 is transferred to block memory 106 over a storage duration 107. The length of storage duration 107 along with timeline 102 represents the transfer duration; that is, the time taken for transfer scheme 100 to transfer the data frame 105 from buffer 104 to block memory 106.

As used herein, block memory indicates memory in which a block of memory is erased before data is written into any portion of that block of memory. The erased portion may be an arbitrary amount or fixed multiple blocks of memory. Examples of block memory include, but are not limited to, EEPROM, NOR Flash, and NAND Flash.

Further, it will be understood that the specific sizes—e.g. 32 Kbytes—of the data frame 105 and of data chunks in later examples are only for purpose of illustration. Other data frame and data chunk sizes could also be used.

Figure 1B:
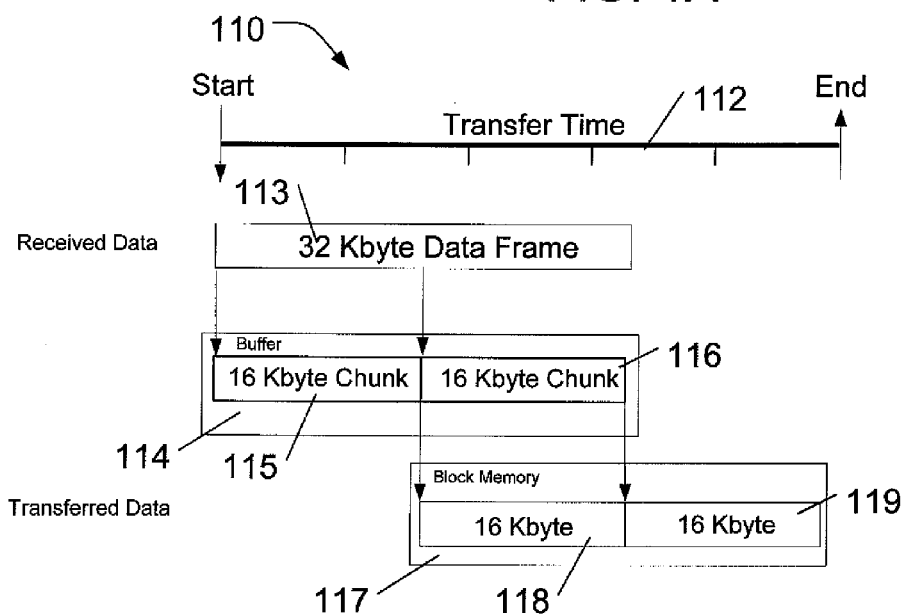
FIG. 1B shows a conventional parallel data transfer scheme in an idealized setting.

In FIG. 1B, the duration of conventional parallel data transfer scheme 110 is measured by timeline 112. The 32-Kbyte data frame 113 is sent serially to buffer 114. When buffer 114 receives the first 16 Kbytes, data transfer scheme 110 transfers data chunk 115 to block memory 117; thus, the 32-Kbyte data frame 113 is chunked. Data transfer scheme 110 chunks data at a predetermined, fixed size of 16 Kbytes. By chunking the 32-Kbyte data frame 113 into two 16-Kbytes data chunks, data chunk 115 can be transferred from buffer 114 to block memory 117 at the same time that data is being received by buffer 114 in data chunk 116. Thus, a parallel transfer of data is achieved. When data chunk 116 is fully received, data transfer scheme 110 transfers data chunk 116 to block memory 117. Timeline 112 shows that the total transfer time (measured from Start to End on transfer time line 112) of parallel data transfer scheme 110.

FIG. 1B, however, shows a transfer scheme in an idealized setting. For example, storage durations 118 and 119 exactly equal the durations of receiving data blocks 115 and 116. In such a setting, chunking data into smaller chunks would lead to shorter total transfer times. In practice, storage durations may fluctuate and memory may not be instantaneously ready to store data. For example, memory such as block memory may need to erase blocks of memory before storing data. Moreover, additional transfer "overhead" is introduced with each split of a data chunk size because each split increases the number of context switches and function calls (e.g., transferring data chunks to block memory) during the transfer process.

Figure 2A:
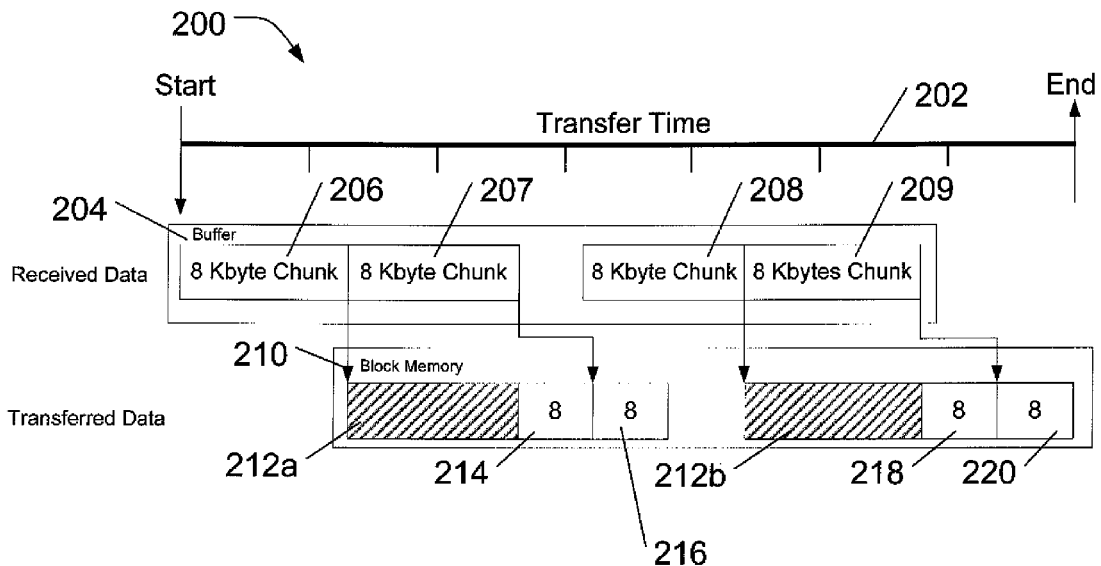
FIG. 2A shows a conventional parallel data transfer scheme in a block memory setting.

Thus, the erase time of block memory, among other reasons, sets a limit on how much a total transfer time may decrease by decreasing a chunk size. Setting a chunk size "too small" will result in interruptions of transmitted data and data storage as shown in FIG. 2A. Conventional parallel data transfer scheme 200 sets chunk size at 8 Kbytes. Thus, transfer scheme 200 will chunk the transmitted 32-Kbyte data frame (not shown) from a transmitting device (not shown) into four 8-Kbyte chunks, 206-209. Buffer 204 contains two 8-Kbyte buffers (not shown).

When transfer scheme 200 transfers the first received 8-Kbyte chunk 206, a block erase duration 212a in block memory 210 occurs. The block erase duration 212a represents the duration it takes block memory 210 to complete a block erase. A 16-Kbyte block of memory is erased over block erase duration 212a. While block erase duration 212a is occurring, buffer 204 receives data for second chunk 207 in its second 8-Kbyte buffer. Block erase duration 212a takes just as long as to receive the second data chunk 207. This results in buffer 204 being full and a temporary stop in data transmission to buffer 204, as seen by the gap between data chunks 207 and 208. The first 8-Kbyte buffer holding first data chunk 206 will not be available for additional data until first data chunk 206 is stored in block memory 210, which occurs after buffer 210 receives second data chunk 207 in its second 8-Kbyte buffer. The 8-Kbyte buffer in buffer 204 is not released until first data chunk 206 is stored on block memory 210, which is complete at the end of storage duration 214.

Second data chunk 207 and third data chunk 208 are partially transferred and received in parallel; however, an advantage of parallel transfer is lost. Since storage duration 216 of second data chunk 207 is shorter than the duration of buffer 204 receiving third data chunk 208, a gap between storage duration 216 and block erase duration 212b results. That is, data is not being continuously saved as it was in block memory 117 of FIG. 1B.

Once buffer 204 receives third data chunk 208, transfer scheme 200 transfers third data chunk 208 to block memory 210. Since the previous two data transfers of 8 Kbytes chunks 206 and 207 each filled the 16 Kbytes of block memory 210 erased over block erase duration 212a, a second block erase duration 212b occurs in order to store more data. Again, because the combined duration of second block erase duration 212b and storage duration 218 is longer than the duration of buffer 204 receiving data for the fourth data chunk 209, a delay is introduced in transferring fourth data chunk 209 to block memory 210. Fourth data chunk 209 is transferred to block memory 210 over storage duration 220.

Figure 2B:
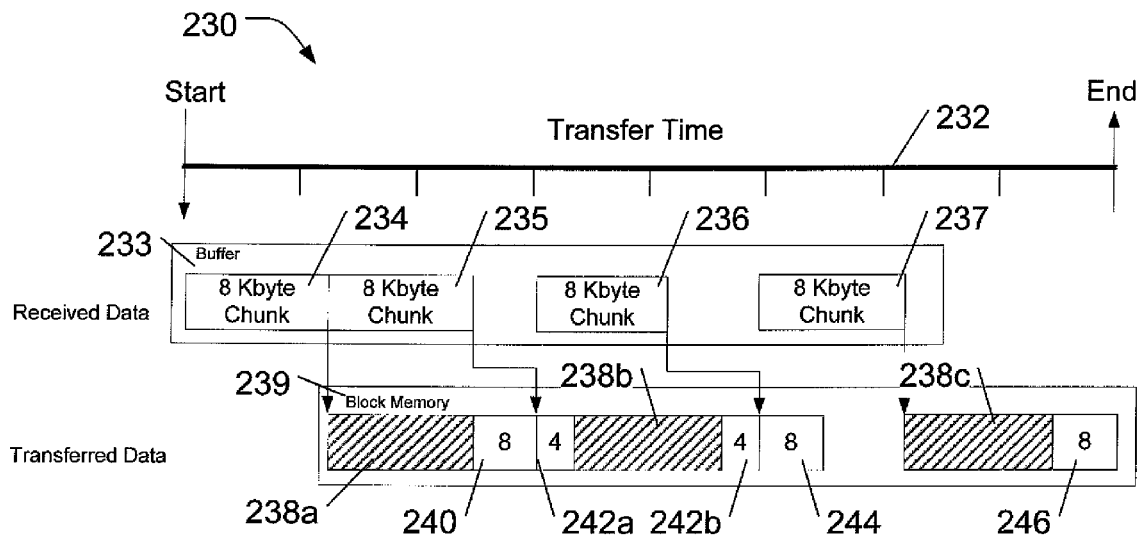
FIG. 2B shows a conventional parallel data transfer scheme in a non-aligned block memory setting.

Delay in parallel transfer may also occur due to chunk size not aligning with the physical erased block size occurring over a block erase duration as shown in FIG. 2B. The conventional parallel data transfer scheme 230 chunks data chunks 234-237 into four 8-Kbyte chunks. Buffer 233 contains two 8-Kbyte buffers (not shown). 12 Kbytes of block memory are erased over each block erase duration 238a-238c.

When first data chunk 234 is transferred to block memory 239, the whole 8-Kbyte chunk is transferred over storage duration 240. Since only 12 Kbytes were erased over block erase duration 238a, transfer scheme 230 then may only transfer the first 4 Kbytes of second data chunk 235 to block memory 239 before another block erase duration 238b occurs. After second block erase duration 238b, block memory 239 accepts the remaining 4 Kbytes of data from data chunk 235. The delay introduced by second block erase duration 238b causes a temporary stop in transmission as seen in the gap between third data chunk 236 and fourth data chunk 237 because buffer 233 becomes full. Third data chunk 236 is transferred over storage duration 244 and the fourth data chunk 237 is transferred over storage duration 246 after block erase duration 238c.

In addition to misalignment of chunk size to block erases size, delay in parallel data transfer may also occur due to variation in block erase and storage durations in block memory devices. Indeed, a block memory device may exhibit these variations within transferring a single data frame: optimal chunk size differs from device to device, from block memory platform to block memory platform, and from data chunk transfer to data chunk transfer. For example, although block erases within a device may erase the same amount of data each time, correcting over-erase errors may take longer in some block erases. Thus, block memory has storage and block erase durations which are typically more varying than constant. Selecting a fixed data chunk involves a tradeoff which results in a chunk size that will function across many devices and platforms, but is not optimized for any one device or platform.

By chunking data adaptively in accordance with an embodiment of the invention, chunk size may be based at least in part on a previous transfer duration. For example, even if a block erase duration of a transfer duration is taking a significant amount of time, a break in transmission will not result because data received during the transfer duration will not be chunked until the previous transfer is complete. Examples of the operation of the invention are shown in FIGS. 3A-3C.

Figure 3A:
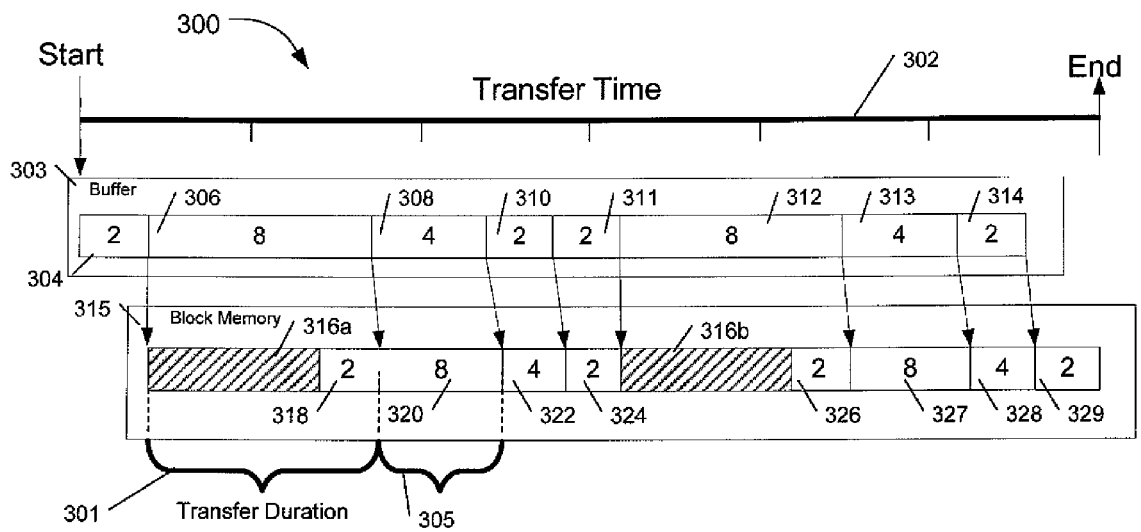
FIGS. 3A-3C show adaptive chunk transfer schemes in accordance with embodiments of the invention.
Figure 3B:
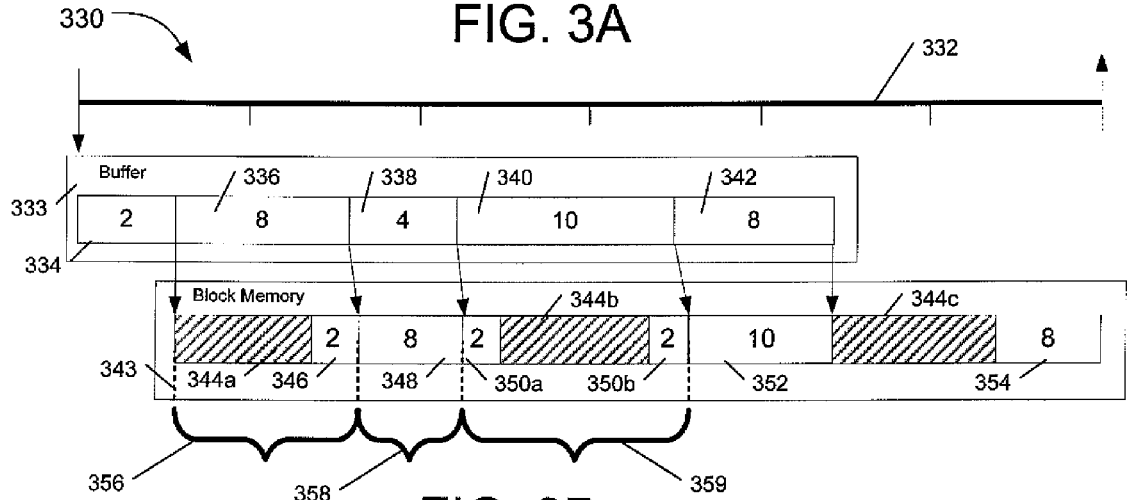
Figure 3C:
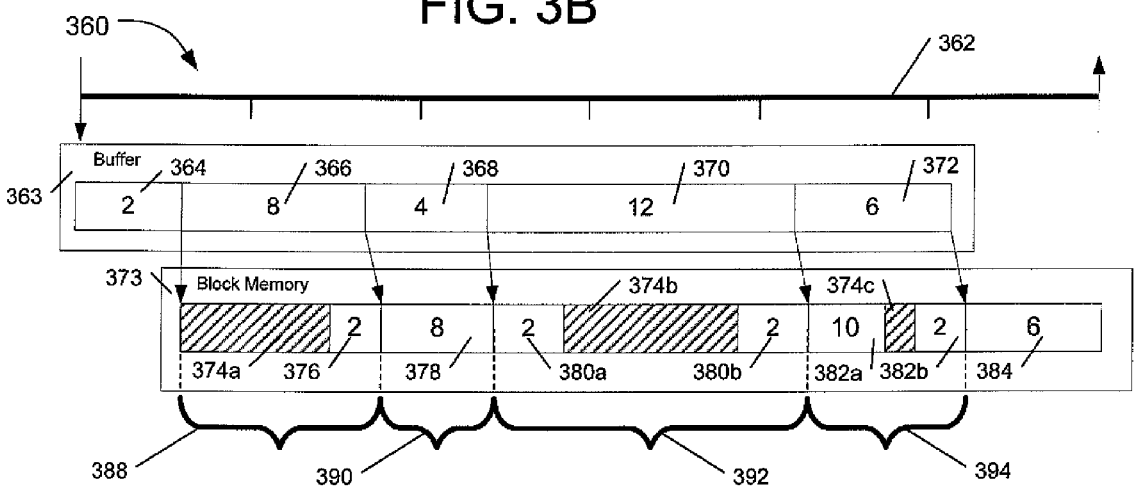

In FIG. 3A, buffer 303 receives data for data chunk 304. Data chunk 304 may be equal to a minimum chunk size. The minimum chunk size may be set relatively low and may equal the minimum update size of block memory 315. The minimum update size may be 2 Kbytes or another size. In transferring data chunk 304 to block memory 315, adaptive chunk transfer scheme 300 erases 16 Kbytes of the block memory 315 over block erase duration 316a. The combined durations of block erase duration 316a and storage duration 318 constitute transfer duration 301. As transfer duration 301 occurs, buffer 303 receives data for data chunk 306.

Since data is not being chunked according a predetermined, fixed size, the size of buffer 303 is limited to a maximum chunk size. The maximum chunk size may be equal to a data frame size of a protocol since a buffer would not receive more than a frame of data if the protocol requires a "Storage OK" signal per frame before sending an additional frame. While in this embodiment one buffer is shown, it is within the scope of the invention to use two or more buffers.

When transfer duration 301 ends, transfer scheme 300 chunks the 8 Kbytes of data received within transfer duration 301 by transferring data chunk 306. Although a slight delay may occur due to data transfer overhead and a data transfer not transferring all of the received data at the point of transfer, the delay is much smaller than the delay shown in FIGS. 1A, 1B, 2A, and 2B. Moreover, since buffer 303 is continuously receiving data during previous transfer durations, temporary transfer breaks within a data frame will not occur because there is always data in buffer 303 to transfer.

Since only storage duration 320 and not a block erase duration constitutes second transfer duration 305, second transfer duration 305 is shorter than the previous transfer duration 301. Thus, buffer 303 receives 4 Kbytes (instead of 8 Kbytes) within the second transfer duration 305 for data chunk 308. Data chunk 308 is transferred over storage duration 322 and data chunk 310 is transferred over storage duration 324. For data chunks 311-314, transfer scheme 300 repeats the same steps as outlined above to transfer a 32-Kbyte data frame (not shown) from buffer 303 to block memory 315. The combined block erase durations 316a and 316b, storage durations 318-329, and the duration to receive the first data chunk 304 equals the total transfer time as measured by transfer time line 302.

FIG. 3B shows that adaptive chunk transfer scheme 330 has a similar total transfer time (if not equal) when 12 Kbytes of data are erased over block erase durations instead of 16 Kbytes as in FIG. 3A. Since adaptive chunk transfer scheme 330 chunks data at least partly based on previous transfer duration, the data transfer rate of transfer scheme 330 is not affected by physical block erase size as is a transfer scheme with a misaligned chunk size.

Buffer 333 receives data for data chunk 334. In transferring data chunk 334 to block memory 343, transfer scheme 330 erases 12 Kbytes of block memory 343 over block erase duration 344a and stores data chunk 334 over storage duration 346 to constitute transfer duration 356. As transfer duration 356 occurs, buffer 333 receives data for data chunk 336. When transfer duration 356 ends, transfer scheme 330 transfers data chunk 336, which is the 8 Kbytes of data received within transfer duration 356.

Buffer 333 receives 4 Kbytes within second transfer duration 358 for data chunk 338. Data chunk 338 is transferred over storage durations 350a and 350b, with the transfer requiring block erase duration 344b. Storage durations 350a and 350b, and block erase duration 344b constitute transfer duration 359. When transfer duration 359 ends, transfer scheme 333 transfers data chunk 340, which is the 10 Kbytes of data received within the transfer duration 359. Although block erase duration 344b occurs while transferring data chunk 338, data chunks are not misaligned as in the case of FIG. 2B.

Data chunk 340 is transferred over storage duration 352. When storage duration 352 ends, transfer scheme 333 transfers data chunk 342, which is the 8 Kbytes of data received within storage duration 352. Block erase duration 344c and block storage duration 354 occur in transferring data chunk 342. The total transfer time is measured by transfer time line 332.

In yet another embodiment of the present invention, buffer 363 receives data and block memory 373 block erases and stores data, both at non-uniform rates. Buffer 363 receives data chunk 364. In transferring data chunk 364 to block memory 373, transfer scheme 360 erases 12 Kbytes of block memory 373 over a block erase duration 374a. As transfer duration 388 occurs, buffer 363 receives data chunk 366. When transfer duration 388 ends, transfer scheme 360 transfers data chunk 366, which is the 8 Kbytes of data received within transfer duration 388.

As transfer duration 390 occurs, buffer 363 receives data chunk 368. When transfer duration 390 ends, transfer scheme 360 transfer data chunk 368, which is the 4 Kbytes of data received within transfer duration 390. As seen within transfer duration 392, block memory 373 takes a longer time to save 2 Kbytes of data as evidenced by storage durations 380a and 380b being longer than storage duration 376 and block erase duration 374b being longer than 374a even though 12 Kbytes are erased over both durations. The transfer scheme 360, however, is unaffected because it receives data chunk 370 for the transfer duration 392.

Conversely, when transfer scheme 360 transfers data chunk 370, block memory 373 takes a shorter time to save 12 Kbytes of data as evidenced by the short storage durations 382a and 382b and the short block erase duration 374c. Again, transfer scheme 360 is unaffected because it chunks data chunk 372 within transfer duration 394. When transfer duration 394 ends, transfer scheme 360 transfers data chunk 372, which is the 6 Kbytes of data received within transfer duration 394. Data chunk 372 is stored over block storage duration 384. The total transfer time is shown by transfer time line 362.

It will be understood that in all of the above examples, specific sizes of buffers, block memory erases, and data chunks and specific lengths of block erase and block storage durations are only for purpose of illustration. Other sizes and durations could also be used and/or implemented.

Figure 4:
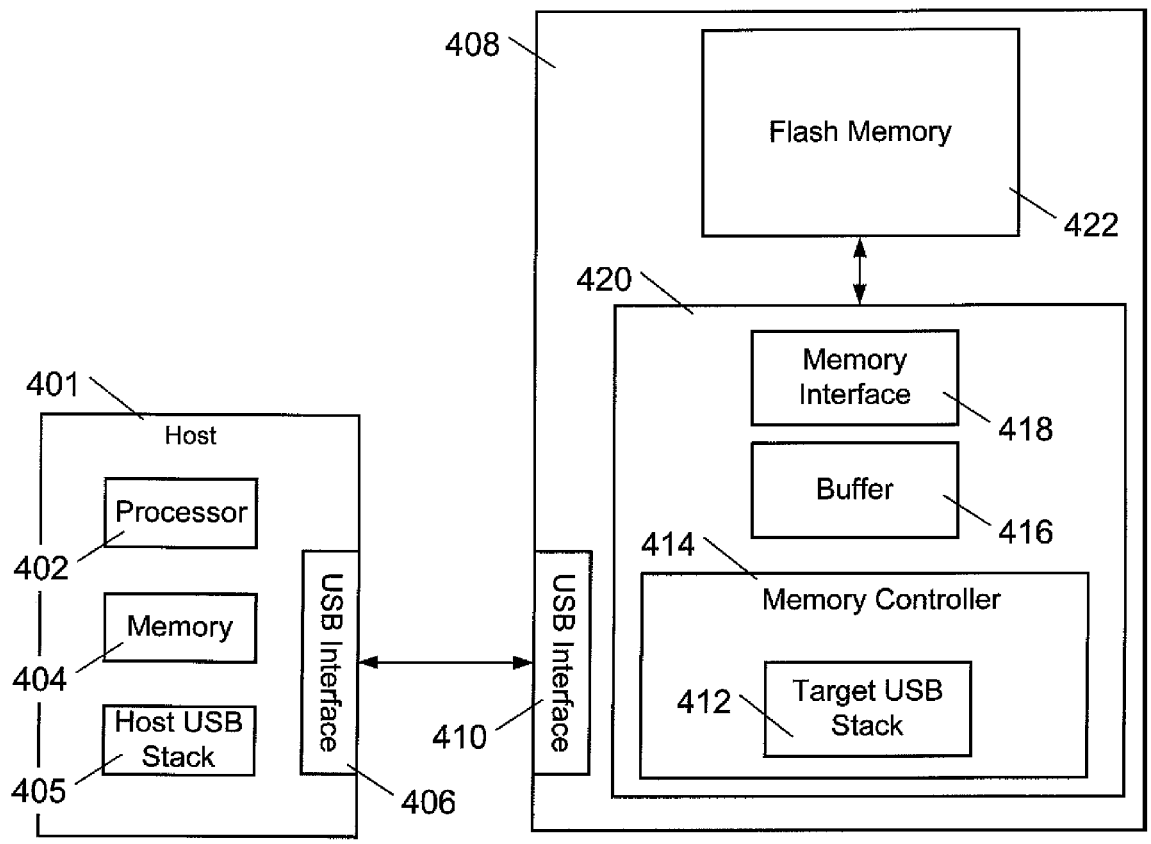
FIG. 4 shows a block diagram structure of a conventional host USB device and a target USB device in accordance with an embodiment of the invention.

FIG. 4 shows an example of a USB embodiment of the present invention. USB host device 401 includes a processor 402, a memory 404, a host USB stack 405 and a USB interface 406. Examples of host devices include, but are not limited to, PCs, notebook computers, PDAs, external hard drives, digital cameras, and printers. Target USB device 408 includes a USB interface 410, a target USB stack 412, controller circuitry 414, a buffer 416, a memory interface 418, a memory controller 420, and a flash memory 422. USB interface 410 facilitates data transfers between host device 401 and target device 408 partly by allowing host device 401 and target device to be physically or wirelessly connected. USB interface 410 may be implemented within memory controller 420 as well. Examples of target devices include, but are not limited to, USB memory devices (e.g., USB flash drives), PCs, notebook computers, PDAs, external hard drives, digital cameras, and printers.

Controller circuitry 414, which may be a processor in some embodiments, controls and manages target device 408 in response to signals received from host device 401. Memory interface 418 typically includes driver and receiver circuitry to facilitate the transfer of data between memory controller 420 and flash memory 422. During processing of host commands such as bulk-transfers, interrupt-driven transfers, and isochronous transfers, controller 420 uses buffer 416 as a temporary storage location before transferring data to flash memory 422. Thus, memory controller 420 may utilize buffer 416 for serial-to-parallel conversion of data because data is received from host device 401 in a serial format but transferred to flash memory 422 in parallel through an adaptive chunking scheme. The calling chain for host commands may start in the host memory 404 or host processor 402, through the host USB stack 405, both USB interfaces 406 and 410, target USB stack 412, buffer 416, memory interface 418, and flash memory 422.

When a transfer host command is executed by host processor 402, host USB stack 405 sends one data frame at a time before the stack 405 expects an acknowledge signal from target USB stack 412 indicating the transmitted data frame has been saved. Since the complete data frame should be saved before target USB stack 412 sends an acknowledge signal back to the host USB stack 405, size of buffer 416 will typically be no larger than the data frame size. The data frame size is typically 64 Kbyte in size, but other sizes may be specified by host USB stack 405.

Similarly, target USB stack 412 executed by memory controller 414 determines chunk size to be stored on flash memory 422. Target USB stack 412 adaptively chunks data by calling a target USB device 408 to transfer data received within a previous data transfer when the previous data transfer has completed. Target USB stack 412 may be adapted to execute method 500, shown in FIG. 5, in transferring data to a block memory device by adaptive chunking. Although the above is discussed in terms of a USB interface, embodiments with other hardware and software interfaces to transfer data are within the scope of the invention.

Figure 5:
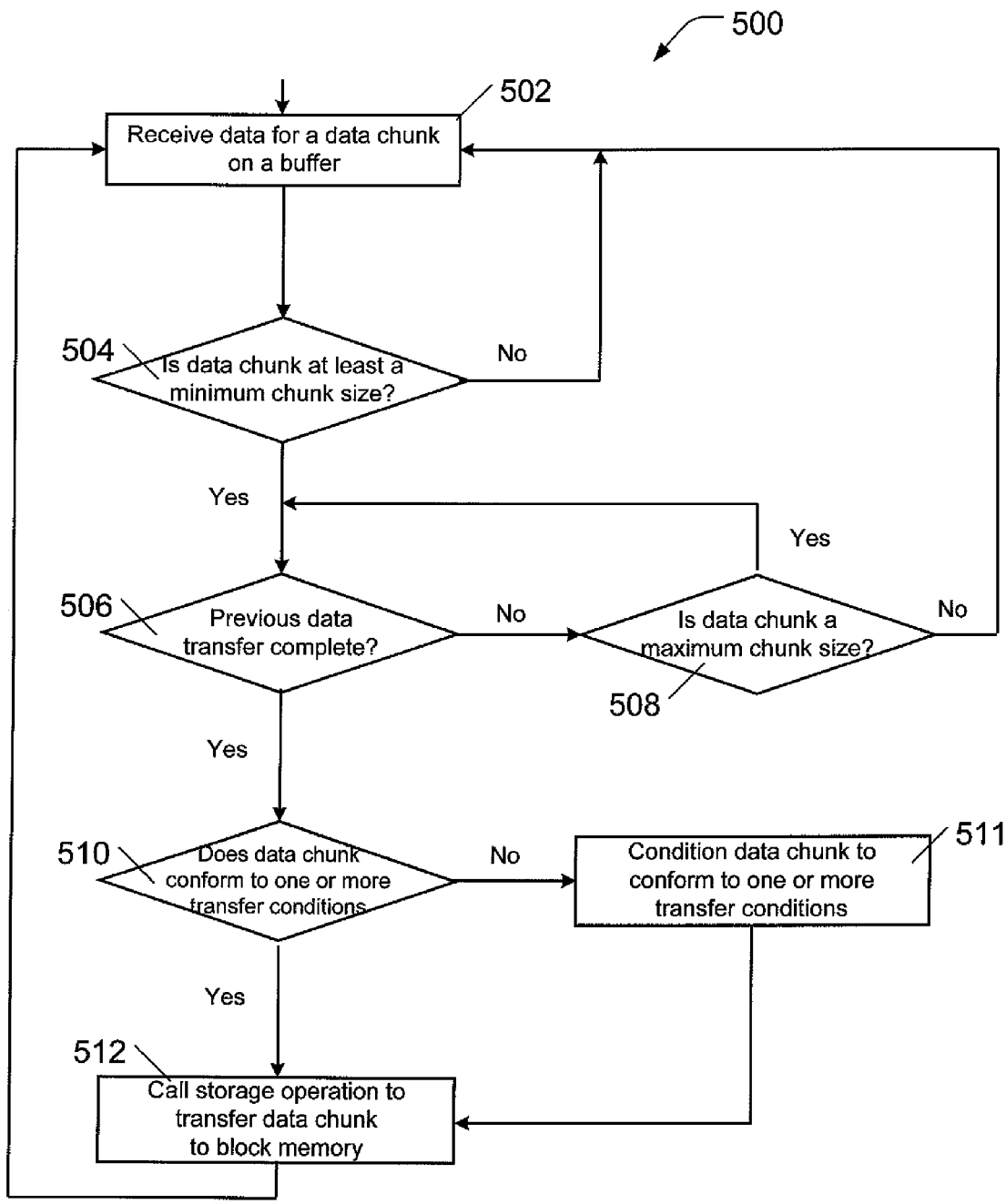
FIG. 5 is a flowchart of a method to transfer data by adaptively chunking data in accordance with an embodiment of the invention.

FIG. 5 shows that in 502, data is received in a data chunk in a buffer. In 504, if the data chunk is not at least a minimum chunk size, then the data chunk will continue to receive more data (e.g., in 502). The minimum chunk size may be set relatively low and may equal the minimum update size of a block memory. In 506, a check is made to see if a previous data transfer is complete. If not, in 508 a check is made to see if the data chunk is not a maximum chunk size. A maximum chunk size may be variable or fixed. For example, it may be set to equal a data frame size of a transfer protocol, wherein no more data will be sent until a previous data frame is stored in memory. In another embodiment, the maximum chunk size may decrease when data chunks are stored in memory. Thus, if the maximum chunk size is initially set to 64 Kbytes and 14 Kbytes of data chunks have been stored, the maximum data chunk size would then be 50 Kbytes. If a maximum chunk size is met, the method will continue to check if the previous transfer is complete. If a maximum chunk size has not been reached, then the data chunk will continue to receive more data (e.g., in 502).

If the previous data transfer is complete, in 510 a check is made to see if the data chunk conforms to one or more transfer conditions. If one or more transfer conditions are not met, then in 511 the data chunk is conditioned. For example, when a previous transfer is complete, a data chunk may have received 11 Kbytes. If a block memory can only store data chunk sizes that are multiples of 2 Kbytes, the data block needs to be conditioned by adding another Kbyte so that a proper transfer can take place. Data may be added to a data chunk, for example, by receiving additional data into the data chunk or by padding dummy digits. If the data chunk does meet all of the transfer conditions, then in 512 the data chunk is transferred to block memory, where in the method returns to 502 to receive data for another data chunk.

While the invention has been particularly shown and described with reference to specific embodiments, it should be understood by those skilled in the art that various changes in form and detail may be made therein without departing from the spirit and scope of the invention. The scope of the invention is thus indicated by the appended claims and all changes which come within the meaning and range of equivalency of the claims are therefore intended to be embraced.

What is claimed is:

1. A method for transferring data to a block memory device by adaptive chunking, the method comprising:
   receiving data for a data chunk;
   determining that the data chunk is ready to be transferred to a block memory;
   transferring the data chunk to the block memory, the transfer occurring over a duration; and
   repeating the above method steps until the transfer is complete, wherein a size of the data chunk is based at least in part on a duration of a previous transfer,
   wherein the size of the data chunk is equal to the amount of data able to be transferred to a buffer during the duration of the previous transfer.

2. The method of claim 1, wherein determining that the data chunk is ready to be transferred to the block memory further comprises determining that a size of the data chunk is greater than or equal to a minimum data chunk size and less than or equal to a maximum data chunk size.

3. The method of claim 1, wherein determining that the data chunk is ready to be transferred to the block memory further comprises determining that a size of the data chunk is at least a minimum update size of the block memory.

4. The method of claim 1, wherein determining that the data chunk is ready to be transferred to the block memory comprises determining that a size of the data chunk conforms to one or more transfer conditions.

5. The method of claim 4, wherein determining that a size of the data chunk conforms to one or more transfer conditions further comprises determining that a size of the data chunk conforms to a data storage chunk size of the block memory.

6. The method of claim 1, wherein the block memory comprises memory blocks of a predetermined size and a fixed size.

7. The method of claim 1, wherein the previous transfer consists of transferring a previous data chunk to the block memory.

8. The method of claim 1, wherein the previous transfer consists of erasing at least one block of the block memory.

9. The method of claim 1, wherein the previous transfer consists of erasing at least one block of the block memory and transferring a previous data chunk to the block memory.

10. The method of claim 1, wherein receiving data for the data chunk comprises receiving a portion of a USB data frame for the data chunk.

11. The method of claim 10, wherein receiving the portion of the USB data frame for the data chunk further comprises receiving the portion of the USB data frame for the data chunk, the portion of the USB data frame being part of a bulk-transfer.

12. The method of claim 10, wherein receiving the portion of the USB data frame for the data chunk further comprises receiving the portion of the USB data frame for the data chunk, the portion of the USB data frame being part of an interrupt-driven transfer.

13. The method of claim 10, wherein receiving the portion of the USB data frame for the data chunk further comprises receiving the portion of the USB data frame for the data chunk, the portion of the USB data frame being part of an isochronous transfer.

* * * * *